June 7, 1938.   O. K. KASPEREIT   2,119,544
PRISM
Filed March 22, 1937
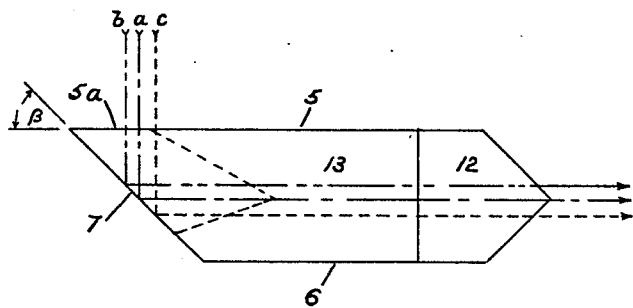
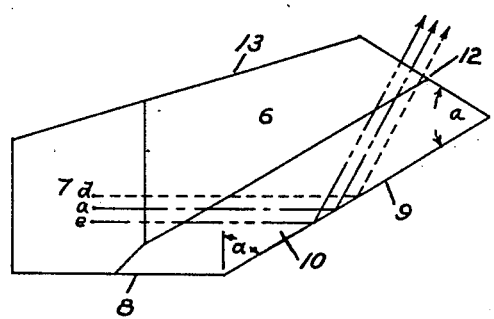
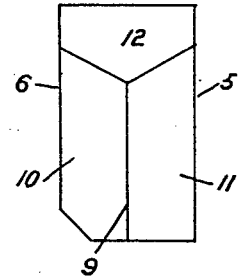
Inventor
Otto K. Kaspereit
By W. N. Roach
Attorney Patented June 7, 1938

2,119,544

UNITED STATES PATENT OFFICE 2,119,544

PRISM

Otto K. Kaspereit, Philadelphia, Pa.

Application March 22, 1937, Serial No. 132,355

1 Claim. (Cl. 88—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a prism.

The purpose of the invention is to provide a one-piece prism designed to deviate the line of sight through an angle of 90° in the horizontal plane and through an angle of 60° in the vertical plane and to invert the image.

A practical embodiment of the invention is illustrated in the accompanying drawing, in which, Fig. 1 is a plan view, Fig. 2 is a view in rear elevation, Fig. 3 is an end view.

Referring to the drawing by characters of reference the angle alpha is equal to 60° and the angle beta is equal to 45°.

The prism consists of a single block having parallel front and rear faces, respectively 5 and 6. Only a portion of the front face is employed as an entrant face 5ª, and opposite this portion is a reflecting face 7 making an angle of 45° therewith. The left end portion of the prism therefore constitutes a right-angle reflecting prism whose bottom face 8 is disposed horizontally. The prism has a roof-angle surface whose ridge 9 is at an angle of 60° to the vertical line of the prism as indicated by the angle of alpha in Fig. 2 and whose faces 10 and 11 disposed in the path of the rays reflected by the face 7, make an angle of 90° with respect to each other and an angle of 45° with respect to the corresponding front and rear faces 5 and 6. An inclined end, forming an emergent face 12, perpendicular to the path of the rays reflected by the faces 10 and 11 makes an angle of 60° with the ridge 9 and meets the upper inclined face 13 which is a plane continuous surface.

The rays of light entering the prism at the face 5ª are deviated by the reflecting face 7 through an angle of 90° in the horizontal plane and are directed onto the roof-angle faces 10 and 11 which deviate them through an angle of 60° in the vertical plane. An inspection of the horizontal rays $a$, $b$, $c$, and the vertical rays $a$, $d$, $e$, shows that the image will appear inverted in the emergent face 12.

I claim:

A single prism for inverting an image embodying an entrant face for rays of light, a reflecting face disposed at an angle of 45° to the entrant face and deviating the rays of light through 90°, a roof-angle reflecting surface whose ridge makes an angle of 60° with a plane perpendicular to the path of the rays deviated by the reflecting face, said surface receiving the rays of light from the reflecting face and deviating them through an angle of 60° to the plane perpendicular to the path of the reflected rays, and an emergent face making an angle of 60° with the ridge of the roof-angle surface.

OTTO K. KASPEREIT.